United States Patent [19]

Yeo

[11] Patent Number: 6,097,377
[45] Date of Patent: Aug. 1, 2000

[54] METHOD FOR DISPLAYING USED TIME OF VIDEO PROCESSING APPARATUS

[75] Inventor: Joung-Hyun Yeo, Suwon, Rep. of Korea

[73] Assignee: SamSung Electronics Co., Ltd., Suwon, Rep. of Korea

[21] Appl. No.: 08/839,813

[22] Filed: Apr. 18, 1997

[30] Foreign Application Priority Data

Apr. 18, 1996 [KR] Rep. of Korea ...................... 96-11789
Nov. 12, 1996 [KR] Rep. of Korea ...................... 96-53553

[51] Int. Cl.[7] .............................. G09G 5/00; G04F 8/00
[52] U.S. Cl. ............................................. 345/211; 368/113
[58] Field of Search ................................... 345/211, 212; 368/113; 348/563, 564, 553, 569; 386/65

[56] References Cited

U.S. PATENT DOCUMENTS

| | | | |
|---|---|---|---|
| 4,087,958 | 5/1978 | Ebihara et al. | 348/553 |
| 4,368,988 | 1/1983 | Tahara et al. | 368/63 |
| 4,901,294 | 2/1990 | Aihara | 368/63 |
| 4,956,825 | 9/1990 | Wilts et al. | 368/9 |
| 5,164,923 | 11/1992 | Avis | 368/4 |
| 5,195,061 | 3/1993 | Curtis et al. | 368/9 |
| 5,457,473 | 10/1995 | Arai et al. | 345/10 |
| 5,493,340 | 2/1996 | Kim | 348/569 |

*Primary Examiner*—Richard A. Hjerpe
*Assistant Examiner*—Anthony J. Blackman
*Attorney, Agent, or Firm*—Robert E. Bushnell, Esq.

[57] ABSTRACT

A method for displaying the used time of a video processing apparatus. If the power of the video processing apparatus is turned on, the total used time of the video processing apparatus is read from a memory and the presently elapsing time is counted accumulatively to the read total used time. Then, the total used time accumulatively counted up to the present is displayed for a predetermined time period. When the predetermined time period has elapsed, the total used time display operation is stopped and it is checked whether a used time display function is turned on by the user. If the used time display function is turned on by the user, the total used time accumulatively counted up to the present time is displayed and it is checked whether the used time display function is turned off by the user. If the used time display function is turned off by the user, the total used time display operation is stopped and it is checked whether the power of the video processing apparatus is turned off. Also, if the used time display function is not turned on by the user, it is checked whether the power of the video processing apparatus is turned off. When the power of the video processing apparatus is turned off, the total used time accumulatively counted up to the present time is stored in the memory.

20 Claims, 3 Drawing Sheets

METHOD FOR DISPLAYING USED TIME OF VIDEO PROCESSING APPARATUS

This application makes reference to, incorporates the same herein, and claims all benefits accruing under 35 U.S.C. §119 from an application for METHOD FOR DISPLAYING USED TIME OF VIDEO PROCESSING APPARATUS earlier filed in the Korean Industrial Property Office on the 18$^{th}$ day of April 1996 and there duly assigned Ser. No. 11780/1996, a copy of which application is annexed hereto.

BACKGROUND OF THE INVENTION

1. Field of the Invention

The present invention relates to a method for displaying the used time of a video processing apparatus such as a monitor, a television receiver, a video cassette tape recorder (VCR) and etc., in which the total used time of the video processing apparatus is counted, stored, and then displayed.

2. Related Art

Generally, video processing apparatuses for use in monitors, television receivers and VCRs are adapted to process only video and audio signals. For example, a monitor which is used as a video display unit of a computer system as disclosed in U.S. Pat. No. 5,457,473 for *Image Display Apparatus* issued to Arai et al., and U.S. Pat. No. 5,493,340 for *Circuit For Displaying Screen Control States Of A Monitor* issued to Kim, processes a video signal received from the computer system and displays the processed video signal on a video display unit such as a cathode ray tube (CRT) or a liquid crystal display (LCD) panel at a resolution based on frequencies of vertical and horizontal synchronous signals.

Television receiver such as disclosed in U.S. Pat. No. 4,475,124 for *Synchronizing System For Character Display* issued to Ankeny et al., U.S. Pat. No. 5,202,669 for *Display Control Device For Superimposing Data With A Broadcast Signal On A Television Screen* issued to Ishimochi et al., receives a broadcast signal, separates the received broadcast signal into video and audio signals, displays the separated video signal on a CRT and amplifies the separated audio signal for output to a speaker. Similarly, video cassette tape recorder VCR records external input video and audio signals or video and audio components of a television broadcast signal on a video tape and reproduces the video and audio signals recorded therefrom for output through a television receiver.

Such video processing apparatuses, however, often require after-sales services because of a variety of faults. In general, such faults which often occur in the video processing apparatus are caused by the user's careless handling of the system, poor quality and deterioration of used components, etc. When there is abnormality in the component, the manufacturer determines whether the abnormal state of the component is caused by poor quality or deterioration of that component on the basis of the used time of the video processing apparatus.

Conventional video processing apparatus has no means capable of measuring the used time thereof. As a result, the manufacturer cannot accurately determine whether the cause of a fault is from poor quality or deterioration of a component.

SUMMARY OF THE INVENTION

Accordingly, it is therefore an object of the present invention to provide an improved video processing apparatus and method for displaying the used time of a video processing apparatus.

It is also an object to provide a method for displaying the used time of a video processing apparatus in which the total used time is accumulatively counted and then displayed, so that the total used time can simply be checked by the user.

These and other objects of the present invention can be achieved by a method for displaying the used time of a video processing apparatus which includes a first step of reading the total used time of the video processing apparatus from a memory if the power of the video processing apparatus is turned on, and counting and accumulating the presently elapsed time to the total used time; a second step of displaying the total used time as accumulatively counted from the first step for a predetermined time period; a third step of stopping the total used time display operation if the predetermined time period has elapsed and determining whether a used time display function is turned on by the user; a fourth step of displaying the total used time as accumulatively counted from the first step if the used time display function is turned on by the user, and determining whether the used time display function is turned off by the user; a fifth step of stopping the total used time display operation if the used time display function is turned off by the user; a sixth step of determining whether the power of the video processing apparatus is turned off if the used time display function is not turned off by the user; and a seventh step of storing the total used time as accumulatively counted from the first step in the memory if the power of the video processing apparatus is turned off.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
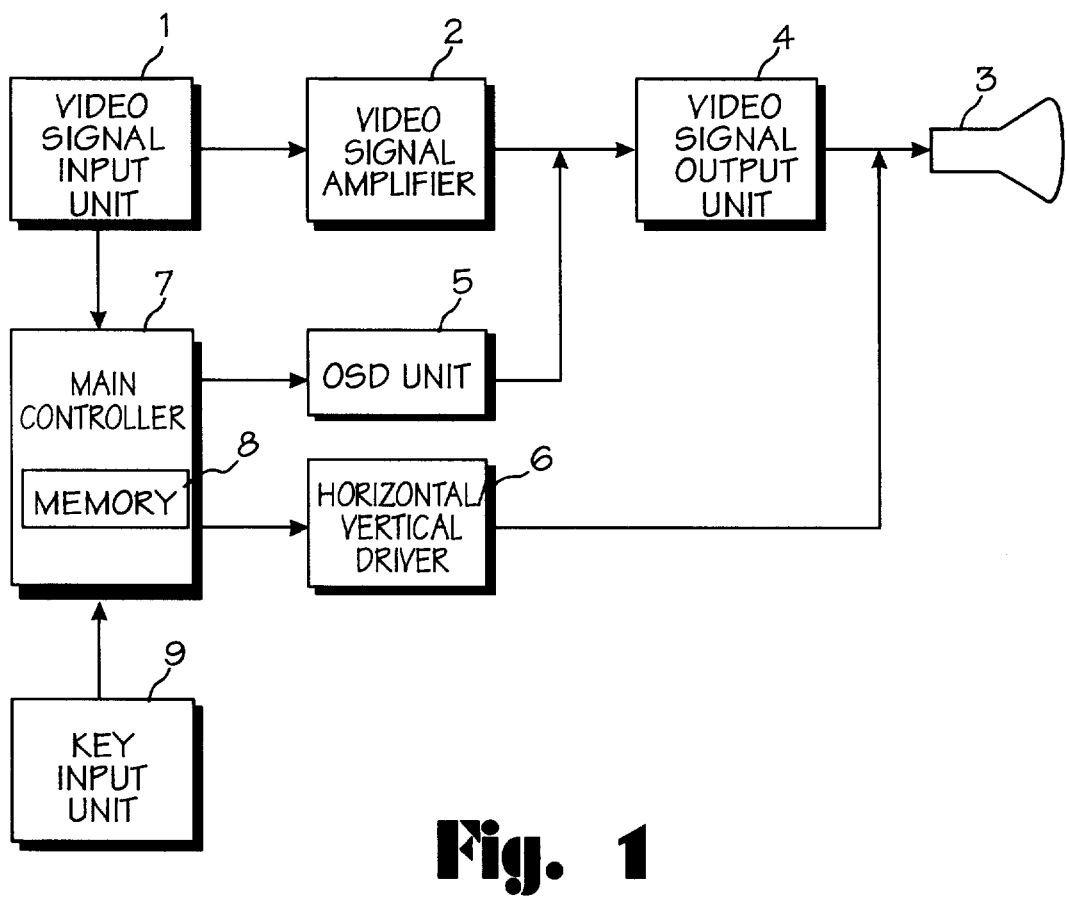
FIG. 1 is a block diagram of a video processing apparatus for displaying the used time on a screen of a monitor constructed according to the principles of the present invention.

Referring now to the drawings and particularly to FIG. 1, which illustrates a video processing apparatus for displaying the used time on a screen of a monitor constructed according to the principles of the present invention. The video processing apparatus includes a video signal input unit 1 for generating a video signal, a horizontal synchronous signal and a vertical synchronous signal from a computer system (not shown), a video signal amplifier 2 for amplifying the video signal from the video signal input unit 1, a video signal output unit 4 for outputting the amplified video signal from the video signal amplifier 2 for a visual display of the same on a screen of the CRT 3. The video signal output unit 4 generally includes a mixer for mixing the amplified video signal and an on-screen display time signal representing the used time to be displayed on the screen of the CRT 3.

A main controller 7 is connected to the video signal input unit 1 for controlling the entire operation of the monitor, including to accumulatively count the total used time of the monitor and store the counted time value in its memory 8. An on-screen display (OSD) unit 5 is connected to the main controller 7 for generating the on-screen display time signal representing the used time to be added to the amplified video signal from the video signal amplifier 2 under the control of the main controller 7 for a visual display on a screen of the CRT 3. A horizontal/vertical driver 6 is connected to the main controller 7 for controlling horizontal and vertical deflections of the CRT 3 under the control of the main controller 7. A key input unit 9 is connected to the main controller 7 for allowing an operator to apply an operation command to the main controller 7.

The operation of the video processing apparatus for displaying the used time on a monitor is now described in detail as follows. First, the video signal input unit 1 inputs the video signal, the horizontal synchronous signal and the vertical synchronous signal from the computer system and separates the inputted video signal from the inputted horizontal and vertical synchronous signals. The separated video signal from the video signal input unit I is amplified by the video signal amplifier 2 and then outputted to the CRT 3 by the video signal output unit 4. The separated horizontal and vertical synchronous signals from the video signal input unit 1 are applied to the main controller 7.

The main controller 7 determines an operation mode in response to frequencies of the separated horizontal and vertical synchronous signals from the video signal input unit 1. Then, the main controller 7 outputs a control signal according to the determined operation mode. In response to the control signal from the main controller 7, the horizontal/vertical driver 6 controls the horizontal and vertical deflections of the CRT 3 to display a desired picture on a screen of the CRT 3.

When the power of the monitor is turned on, the main controller 7 reads the total used time from the memory 8 therein and counts and accumulates the presently elapsed time to the total used time. If a used time display function is turned on by the user through the key input unit 9, the main controller 7 controls the OSD unit 5 to generate an OSD character signal indicative of the total used time accumulatively counted up to the present. Then, the OSD character signal from the OSD unit 5 is output to the CRT 3 by the video signal output unit 4 to be displayed on the screen of the CRT 3.

Thereafter, when the power of the monitor is turned off, the main controller 7 stores the total used time accumulatively counted up to the present time in the memory 8 to read the same for the continuous accumulative counting operation when the power of the monitor is again turned on. Noticeably, the total used time data stored in the memory 8 must not be erased even if the power of the monitor is turned off. Therefore, in the preferred embodiment of the present invention, a nonvolatile memory such as an erasable and programmable read-only-memory (EPROM) is used as the memory 8 to prevent the stored total used time data from being damaged even if the power of the monitor is turned off. In addition, the main controller 7 comprises a backup power source, for performing the normal operation until the total used time data is stored in the memory 8 even if the power of the monitor is turned off.

Figure 2A:
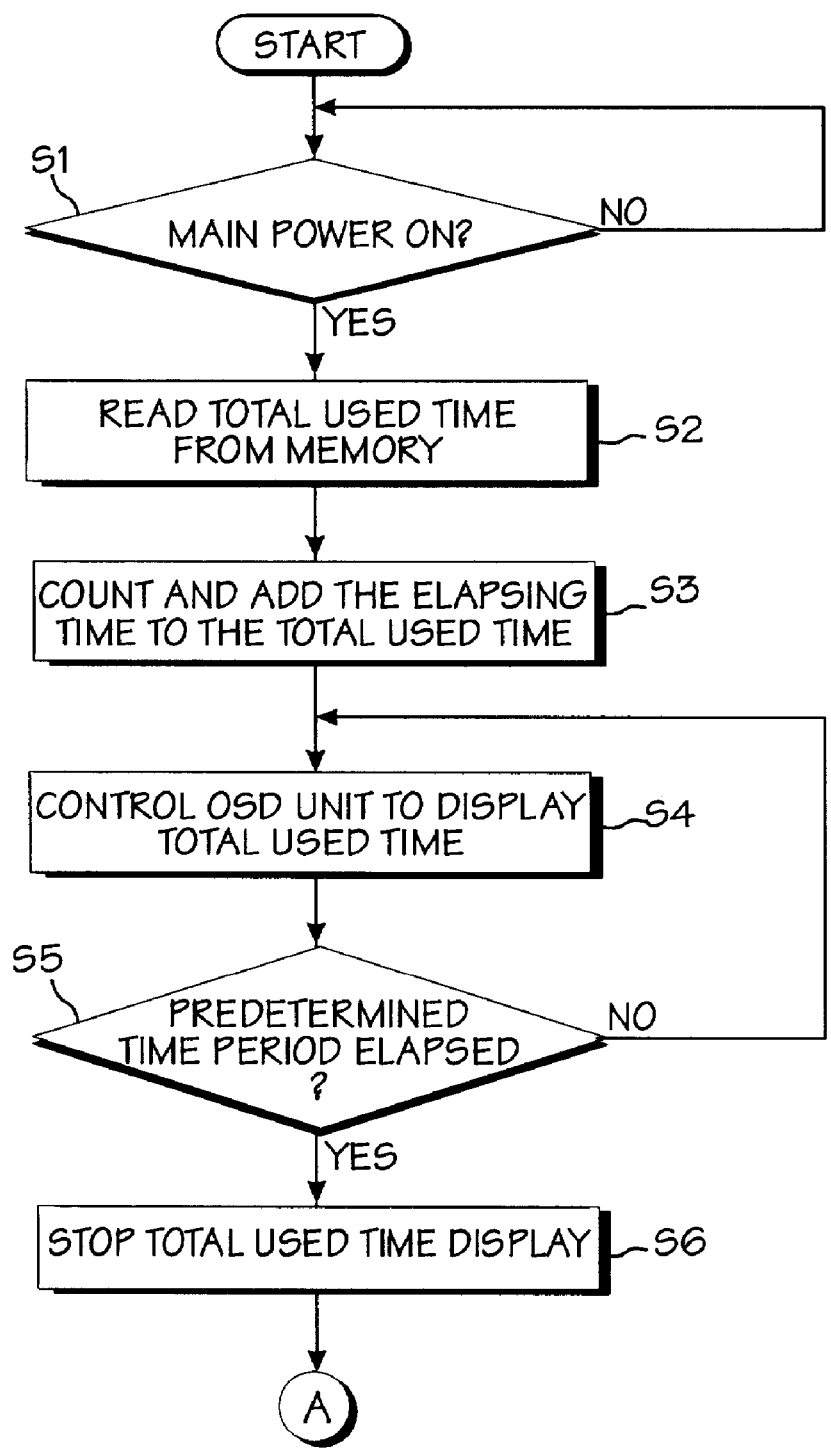
FIGS. 2A and 2B together form a flowchart of a control method for displaying the total used time of the monitor constructed according to the principles of the present invention.
Figure 2B:
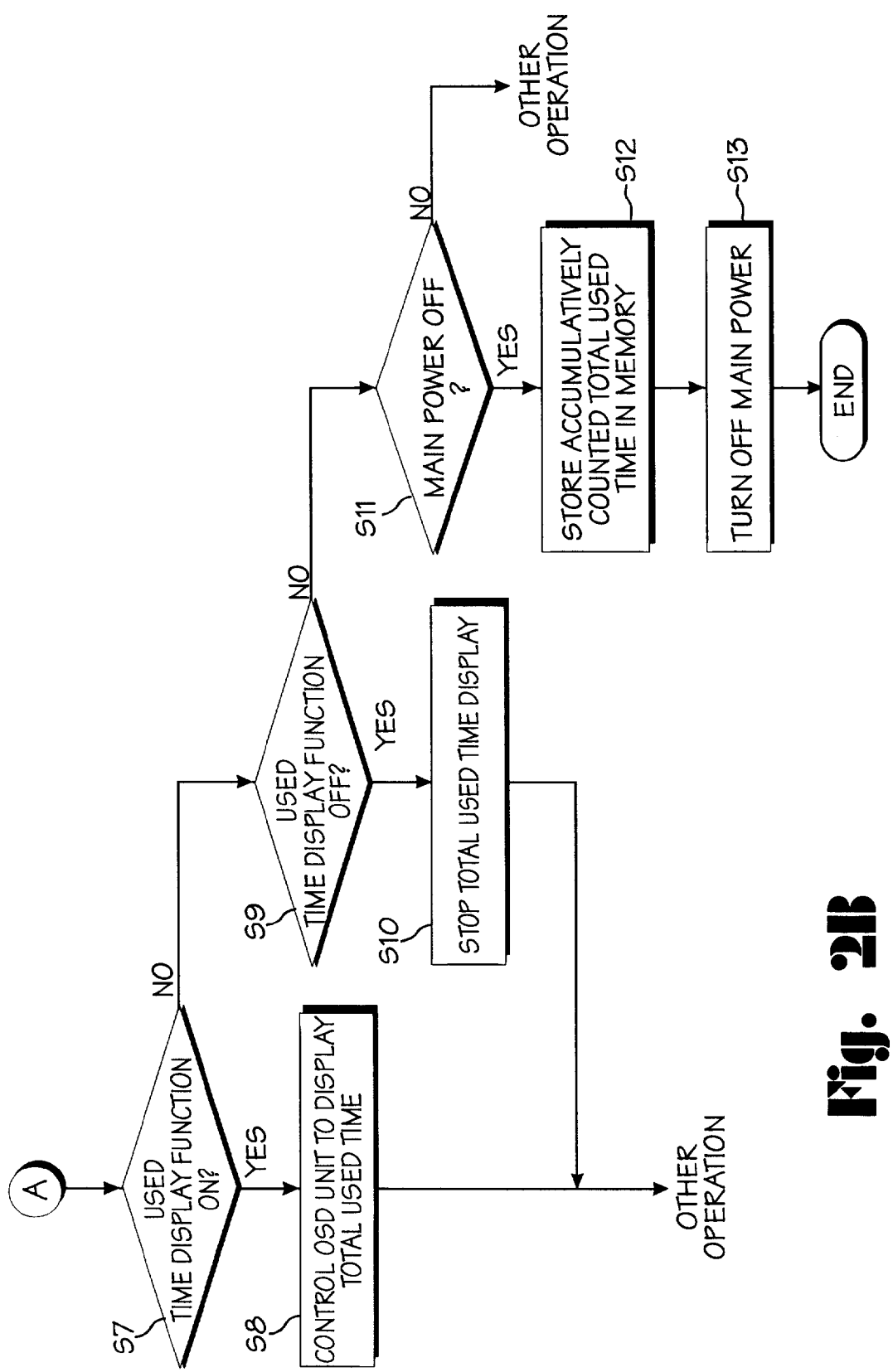

Turning now to FIGS. 2A and 2B which together form a flowchart of a method for displaying the used time of the monitor according to the principles of the present invention. First, if the main power of the monitor is turned on at step S1, the main controller 7 reads the total used time from the memory 8 therein at step S2.

The main controller 7 then counts and accumulates the presently elapsed time to the total used time at step S3. At step S4, the main controller 7 controls the OSD unit 5 to display the total used time accumulatively counted up to the present on the screen of the CRT 3. Then, the main controller 7 determines whether a predetermined time period has elapsed at step S5.

If the main controller 7 determines that the predetermined time period has not elapsed at step S5, the main controller 7 returns to step S4 in order to continuously display the total used time on the screen of the CRT 3. However, if the main controller 7 determines that the predetermined time period has elapsed at step S5, the main controller 7 stops the total used time display operation at step S6.

Then, the main controller 7 determines whether the used time display function is turned on by the user through the key put unit 9 at step S7. If the used time display function is not turned on by the user at step S7, the main controller 7 checks whether the used time display function is turned off by the user at step S9. If the used time display function is not turned off by the user at step S9, the main controller 7 checks at step S11 whether the main power of the monitor is turned off.

When the main controller 7 determines that the used time display function is turned on at step S7, the main controller 7 controls the OSD unit 5 to display the total used time on the screen of the CRT 3 at step S8. If the main controller 7 determines that the used time display function is turned off by the user at step S9, however, the main controller 7 stops the total used time display operation at step S10. If the main controller 7 determines that the used time display function is not turned off by the user at step S9, the main controller 7 checks whether the main power of the monitor is turned off at step S11. If the main power of the monitor is turned off, the main controller 7 stores the total used time accumulatively counted up to the present time in the memory 8 at step S12 to count the presently elapsing time accumulatively to the total used time stored in the memory 8 when the main power of the monitor is again turned on. Then, the main controller 7 turns off the main power of the monitor at step S13. Otherwise, the main controller 7 performs other operations.

As described above, the total used time is displayed when the main power of the monitor is turned on, or when the used time display function is turned on by the user. Alternatively, the total used time may be displayed only when the used time display function turned on by the user, not when the main power of the monitor is turned on. Although the used time display method of the present invention as been applied to the monitor for illustrative purpose, those skilled the art will appreciate that it can simply be applied to other video processing apparatus.

As apparent from the above, the total used time of the video processing apparatus constructed according to the principles of the present invention is accumulatively counted and then displayed. Therefore, the user can accurately check the total used time of the video processing apparatus.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for displaying the used time of a video processing apparatus on a screen of a monitor, comprising the steps of:

reading a total used time of said video processing apparatus from a memory, when the power of said video processing apparatus is turned on;

counting and accumulating an elapsed time to the total used time;

displaying the total used time accumulatively counted on the screen of the monitor for a predetermined time period;

automatically not displaying the total used time accumulatively counted on the screen of the monitor, when the predetermined time period has elapsed;

determining whether a used time display function is turned on by a user;

displaying the total used time accumulatively counted on the screen of the monitor, when the used time display function is turned on by the user;

stopping the total used time display operation when the used time display function is turned off by the user;

determining whether the power of said video processing apparatus is turned off; and storing the total used time accumulatively counted in said memory, when the power of said video processing apparatus is turned off.

2. The method of claim 1, further comprising the step of turning off the power of said video processing apparatus after the total used time as accumulatively counted is stored in said memory.

3. The method of claim 1, further comprising the step of performing other operations as instructed by the user after the total used time is displayed on the screen of the monitor.

4. The method of claim 1, further comprising the step of performing other operations as instructed by the user after the total used time display on the screen of the monitor is stopped.

5. The method of claim 1, further comprising the step of performing other operations instructed by the user when the power of said video processing apparatus is not turned off.

6. A method for displaying the used time of a video processing apparatus, comprising the steps of:

reading the total used time of said video processing apparatus from a memory when the power of said video processing apparatus is turned on, and counting and accumulating an elapsed time to the total used time;

determining when a used time display function is turned on by a user;

displaying the total used time as accumulatively counted for a predetermined time period when said determining step determines that the used time display function is turned on by the user, and detecting whether the used time display function is turned off by the user;

automatically not displaying the total used time accumulatively counted on the screen of the monitor, when the predetermined time period has elapsed;

sensing when the power of said video processing apparatus is turned off, when said detecting step detects that the used time display function is not turned off by the user; and storing the total used time as accumulatively counted in said memory, when said sensing step senses that the power of said video processing apparatus is turned off.

7. The method of claim 6, further comprising said step of automatically not displaying the total used time accumulatively counted on the screen of the monitor, when the predetermined time period has elapsed and when said detecting step detects that the used time display function is turned off by the user.

8. The method of claim 6, further performing other operations as instructed by the user after said step of displaying the total used time.

9. The method of claim 6, further performing other operations as instructed by the user after said step of automatically not displaying the total used time.

10. The method of claim 6, further performing other operations instructed by the user when said sensing step senses that the power of said video processing apparatus is not turned off.

11. A video processing apparatus for use in a monitor having an on-screen display, comprising:

means for receiving a video signal from an external source to be displayed on said monitor;

on-screen display means for generating an on-screen time signal indicating a total used time of said monitor;

controller means having a memory for storing therein the total used time of said monitor, for controlling said on-screen display means generating said on-screen time signal indicating the total used time stored in said memory to be displayed on an on-screen portion of said monitor; and monitor function means for combining said on-screen time signal and said video signal and adjusting operating characteristics of a combined signal for a visual display on said monitor, said controller means automatically stopping the visual display of the total used time on said on-screen portion of said monitor;

said controller means reading the total used time accumulatively stored in said memory and updating the total used time for a visual display on said on-screen portion of said monitor, when said monitor is turned on;

said controller means automatically stopping the visual display of the total used time on said on-screen portion of said monitor after a predetermined time period.

12. The video processing apparatus of claim 11, further comprising said monitor corresponding to a cathode ray tube conveying varying visual information to a user.

13. The video processing apparatus of claim 11, further comprising said memory of said controller means corresponding to an erasable and programmable read only memory.

14. The video processing apparatus of claim 11, further comprising said controller means controlling a visual display of the total used time accumulatively stored in said memory, when a used time display function is turned on by a user via a key input unit.

15. The video processing apparatus of claim 14, further comprising said controller means automatically stopping the visual display of the total used time on said on-screen portion of said monitor, when the used time display function is turned off by the user via said key input unit.

16. The video processing apparatus of claim 14, further comprising said controller means updating the total used time and storing the updated total used time in said memory, when the monitor is turned off.

17. The apparatus of claim 11, said monitor corresponding to a cathode ray tube unit conveying varying visual information to a user, said visual information including the total used time of said monitor.

18. The apparatus of claim 17, said cathode ray tube unit receiving horizontal synchronization signals and vertical synchronization signals controlling an appearance of said visual information.

19. The apparatus of claim 18, further comprising a driver unit controlling said horizontal and vertical synchronization signals.

20. The apparatus of claim 11, said monitor corresponding to a liquid crystal display unit conveying varying visual information to a user, said visual information including the total used time of said monitor.

* * * * *